May 28, 1963 A. R. NORDEN 3,091,679
PANEL MOUNTED SWITCHING DEVICE
Filed Feb. 19, 1959 2 Sheets-Sheet 1

INVENTOR.
ALEXANDER R. NORDEN
BY
Paul S. Martin
ATTORNEY

May 28, 1963 A. R. NORDEN 3,091,679
PANEL MOUNTED SWITCHING DEVICE
Filed Feb. 19, 1959 2 Sheets-Sheet 2

INVENTOR.
ALEXANDER R. NORDEN
BY
Paul S. Martin 3,091,679
Patented May 28, 1963

3,091,679
PANEL MOUNTED SWITCHING DEVICE
Alexander R. Norden, New York, N.Y., assignor to Federal Pacific Electric Company, a corporation of Delaware
Filed Feb. 19, 1959, Ser. No. 794,425
10 Claims. (Cl. 200—168)

This invention relates generally to a circuit breaker and, more particularly, to a panel mounted circuit breaker of the type which is manually operable to open or close the circuit and automatically operable to open the circuit upon the occurrence of an overload or short circuit condition.

The primary aim and object of the present invention is the provision of an improved arrangement for panel mounting a circuit breaker in a simple, easy, secure and decorative manner. Pursuant to this object of the present invention the circuit breaker is mounted to a panel through the intermediation of a mounting bracket which is assembled with the circuit breaker and panel in such a manner as to provide for the mutual retention of the bracket and breaker with respect to the panel which is clamped therebetween. Further pursuant to this object of the present invention the bracket in panel mounted position provides an esthetically attractive trim plate for the breaker to provide the assembly with a neat and finished appearance.

Yet another object of the present invention is the provision of a generally improved panel mounted circuit breaker assembly in which the circuit breaker may be quickly and easily securely assembled to the panel through the intermediation of a simple, inexpensive and easily fabricated mounting part.

The above and other objects, features and advantages of the present invention will be more fully understood from the following description considered in connection with the accompanying illustrative drawings.

Figure 1:
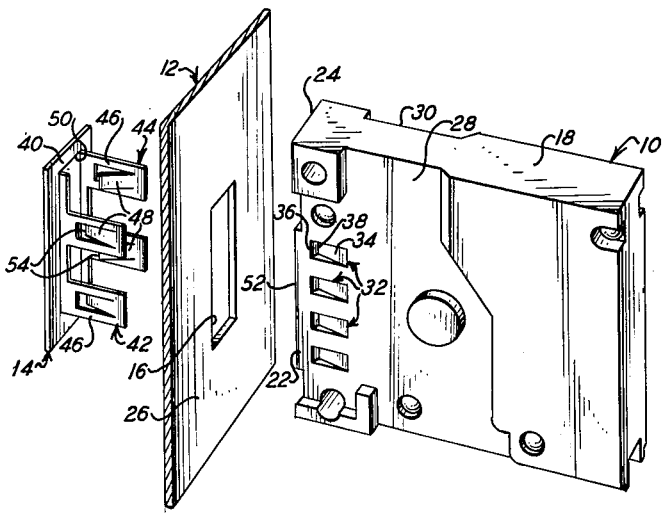
Figure 3:
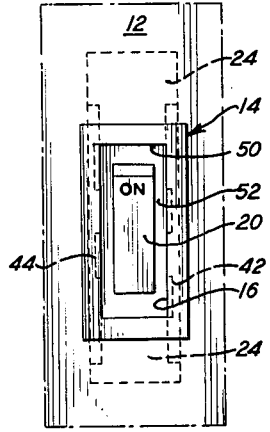
Figure 2:
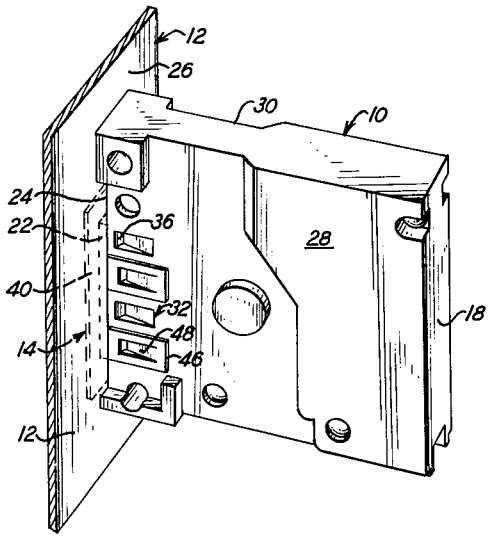
Figure 4:
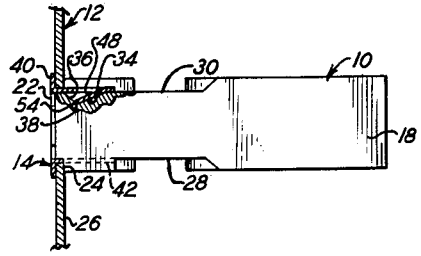
Figure 5:
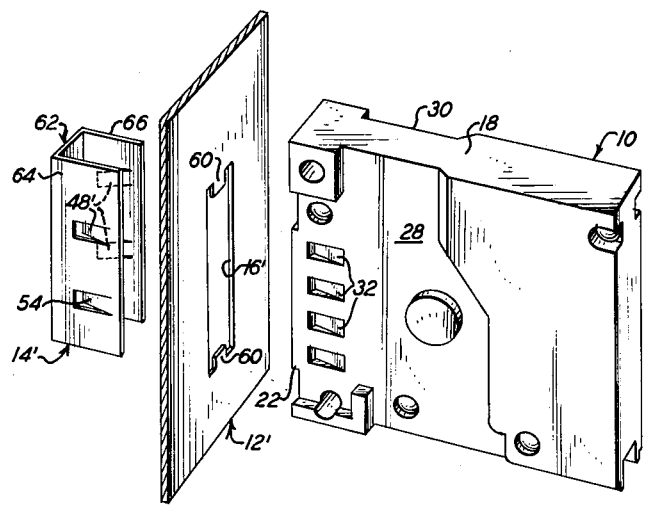
Figure 7:
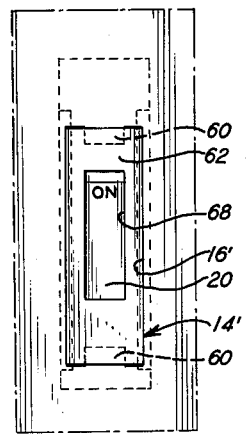
Figure 6:
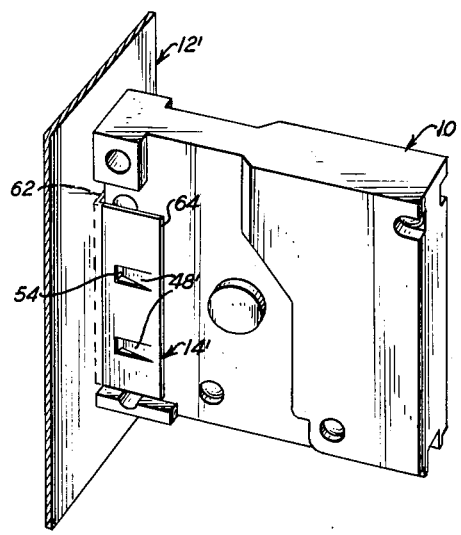
Figure 8:
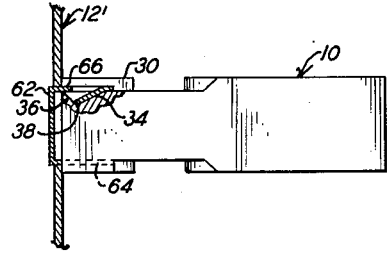

In the drawings:
FIG. 1 is a side perspective view of the mounting bracket, panel, and circuit breaker in disassembled relation;
FIG. 2 is a view similar to FIG. 1 with the components in assembled relation;
FIG. 3 is a front view of the assembly;
FIG. 4 is a top view thereof with a portion of the circuit breaker broken away to reveal structural details; and
FIGS. 5–8 correspond to FIGS. 1–4, respectively with respect to another embodiment of the present invention.

Referring to the drawings, and more particularly to FIGS. 1–4 thereof, there is shown a circuit breaker 10 adapted to be mounted on panel 12 through the intermediation of the mounting bracket 14. The panel 12 which may be part of any desired structure or enclosure is provided with an elongated rectangular opening 16 to receive the mounting bracket and circuit breaker. The circuit breaker 10 is basically of conventional construction and outline and is provided with a molded insulating casing 18 having an operating handle 20 and a protruding portion 22 which surrounds the operating handle. The operating handle is of the flush mounted type in the illustrated embodiment and is operatively connected to the circuit breaker mechanism enclosed in casing 18 for actuating such mechanism to open and close the circuit protected by the breaker. The casing 18 has a generally flat front wall 24, outside of portion 22, which seats against the rear face 26 of the panel in the mounted condition of the breaker. At each of the opposite parallel sides 28, 30 of the breaker casing there is provided a series of laterally spaced and vertically aligned parallel recesses 32 molded into the sidewalls of the casing for mounting the latter to the panel, each recess having a pair of inclined differential length bottom wall portions 34 and 36 which meet at apex 38 to define an obtuse angle thereat. The wall portion 34 of recess 32 is substantially longer than wall portion 36 and, because of the obtuse angle between portions 34 and 36, the latter defines an inclined latching shoulder for the bracket 14 in the manner to be described.

The mounting bracket 14 may be formed of any suitable sheet material, for example sheet metal, and comprises a rectangular trim plate or frame 40 having a pair of laterally spaced substantially parallel mounting arms 42 and 44 projecting inwardly of said plate in substantially perpendicular relation therewith. Each arm 42, 44 includes a pair of spaced aligned mounting fingers 46 having resilient mounting detents or tabs 48 bent inwardly out of the plane of the fingers. The detents 48 are adapted to resiliently engage in companion recesses 32 of the breaker which are dimensioned to accommodate the same. The fingers 46 and their detents of the arms are horizontally staggered to register with correspondingly staggered recesses 32 at the opposite sides of the breaker. The arms 42, 44 are spaced to accommodate the casing 18 of the breaker therebetween, said spacing substantially corresponding to the width of opening 16. The arms 42, 44 are of a length substantially corresponding to the length of opening 16 and the portion 22. In practice, the bracket may be formed of an initially rectangular flat blank which is cut and shaped to the configuration best shown in FIG. 1, the arms 42 and 44 being cut in said blank and bent rearwardly out of the plane thereof to form the staggered fingers with the detents 48 being cut at three sides on said fingers and bent inwardly thereof.

The bracket is mounted to the panel by extending the same through the opening 16 so that the frame 40 overlies and abuts the panel as shown in FIG. 4. With the bracket held in this position, the breaker is projected between the fingers 46 so that the detents 48 thereof engage in companion recesses 32 of the breaker casing to thereby mount the breaker to the panel. It will be understood that the detents yield or cam towards the plane of the fingers on insertion of the breaker between the arms and that such detents snap engage in the recesses when the breaker is "homed" against the panel. In this "home" or assembled position of the breaker, portion 22 thereof interfits in the opening 50 defined by frame 40, the latter forming a decorative trim around the exposed surface 52 of the breaker to give an attractive neat and finished appearance to the assembly as shown in FIG. 4. The exposed surface 52 of the breaker is in substantially flush relation with the panel. The detents 48 engage against the wall portion 34 of the recesses as shown in FIG. 4 with the leading edges 54 of said detents engaging against wall portions 36 in the region of apex 38. This engagement of the detents in the casing recesses serves to secure the breaker against displacement from assembly with the panel, the detents coacting with wall portions 36 of the recesses to prevent separation of the bracket and breaker and provide for the mutual retention thereof with respect to the panel. Thus the panel is clamped or captured between the bracket and breaker on the assembly thereof. Portions 36 serve as positive stops for the detents on separation stress applied between the bracket and breaker, the inclined portions 36 tending to eliminate looseness. The staggered arrangement of the fingers provides for the formation of the bracket from a single rectangular blank while achieving the requisite support for the installation. The bracket may be reversed to dispose arms 42 and 44 in opposite positions without affecting the mounting of the breaker, the detents in such case engaging in the other pairs of registering recesses.

With reference to FIGS. 5–8, there is shown another embodiment of the present invention which differs from the previous embodiment in the manner to be described in detail hereinafter. The circuit breaker 10 of this embodiment corresponds in all the respects to the circuit breaker previously described. The panel 12′ is provided with an opening 16′ to receive the bracket 14′, said opening having a pair of opposed inwardly extending flanges 60 at the opposite ends thereof which are adapted to engage the bracket. The bracket 14′ is generally U-shaped having a base wall 62 and a pair of projecting arms 64 and 66, said arms having detents 48′ corresponding in all respects to the detents previously described. Thus the resilient detents 48′ of the arms are disposed in horizontally staggered relation and are bent inwardly of the plane of the arms. The base wall 62 is provided with an opening 68 to expose the operating handle 20 at the front of the panel in the installed condition of the breaker. The breaker is secured in assembled relation with the panel in the manner previously described.

The bracket 14′ is extended through companion opening 16′ to engage base wall 62 with the tongues 60, the latter acting as stops for the bracket. The circuit breaker is projected between the arms 64 and 66 to engage the detents 48′ in their companion recesses of the breaker and "home" the latter against the panel, thereby to assemble the breaker to the panel. The base wall 62 defines a trim plate for the breaker to provide a neat and finished appearance at the front of the panel. The operating handle 20 is exposed through opening 68 and the remainder of the breaker is concealed by the bracket and panel. Portion 22 of the breaker interfits with the bracket in substantially flush relation with the panel. Bracket 14′ may be formed of an initially flat blank bent into the U-shaped configuration shown in FIG. 5. The bracket may be reversely mounted on the panel without affecting breaker mounting in the desired orientation thereof, as previously described. As in the previous embodiment, the detents 48′ and recesses 32 coact to prevent separation of the bracket and breaker and provide for the mutual retention thereof with respect to the panel.

As in the form in FIGS. 1–4, the ends of portion 22 of the circuit breaker abut the ends of the panel opening (defined by the ends of tongues 60) for preventing shift of the circuit breaker along opening 16′. Also, as in FIGS. 1–4, a portion 62 of the panel that overlies the front part 24 of the circuit breaker (adjoining projecting portion 22) is held against that front part of the circuit breaker by a front part of the mounting bracket. Further, as in FIGS. 1–4, the hole 16′ is only wider than circuit breaker portion 22 by an amount required to accommodate the parts of the mounting bracket that extend from the front of the panel, and through the opening to embrace the circuit breaker.

Various additional modifications of the above embodiments of the invention will readily occur to those skilled in the art, and therefore the invention should be broadly construed in accordance with its full spirit and scope.

Having thus described my invention what I claim as new and desire to secure by Letters Patent is:

1. A switching device and a bracket for mounting the switching device to a panel having an opening at a switching device mounting region, said switching device comprising a casing with a generally planar front wall having an operating handle accessible thereat, said casing having recesses defined therein at the opposite sides thereof, and said bracket comprising a front plate having laterally spaced parts projecting rearwardly thereof, said parts having resilient detents extending inwardly thereof, said front plate being adapted for overlying engagement with the panel with said parts extending through said opening and along the opposite sides of said casing in the mounted position thereof, the latter being adapted to be retained in mounted position with said front wall adjacent the panel at the opening thereof by the engagement of said detents in companion recesses of said casing, the front wall of the casing and the rear surface of said front plate being in spaced parallel planes separated by the thickness of the panel when said detents are received in said recesses, said front plate defining a decorative trim plate for the switching device and having an opening for exposing said handle at the front of the panel, the detents of one of said parts being staggered with respect to the detents of the other part to register with correspondingly staggered recesses at the opposite sides of said casing.

2. A switching device and mounting bracket therefor for mounting the switching device to a panel having an opening at a switching device mounting region, said switching device comprising a casing with a generally planar front wall having an operating handle accessible thereat, said casing having recesses defined therein at the opposite sides thereof, and said bracket being of one-piece sheet metal construction comprising a front peripherally extending trim plate having vertically spaced and aligned fingers at opposite sides thereof defining an opening therebetween, said fingers being provided with inwardly extending resilient detents, the fingers at one side of said plate being horizontally staggered with respect to the fingers at the opposite side thereof, said front trim plate being adapted for overlying engagement with the panel with said fingers extending through the panel opening and along the opposite sides of said casing in the mounted position thereof in which said front wall engages the rear face of the panel, said casing being retained in mounted position with said trim plate engaging the front face of the panel at the opening thereof by the interengagement of said detents in companion registering recesses of said casing, the panel being thereby captured between said casing and bracket, said trim plate having an opening for exposing said handle at the front of the panel.

3. A switching device and mounting bracket therefor for mounting the switching device to a panel having an opening at a switching device mounting region, said switching device comprising a casing with a generally planar front wall having an operating handle accessible thereat, said casing having recesses defined therein at the opposite sides thereof, and said bracket being of one-piece sheet metal construction and of generally U-shaped configuration comprising a front trim plate having a pair of inturned laterally spaced arms defining an opening therebetween, each arm having vertically spaced inwardly extending resilient detents with the detents of one arm being horizontally staggered with respect to the detents of the other arm, said front trim plate being adapted for overlying engagement with the panel with said arms extending through the panel opening and along the opposite sides of said casing in the mounted position thereof in which said front wall engages the rear face of the panel, said casing being retained in mounted position with said trim plate engaging the front face of the panel at the opening thereof by the interengagement of said detents in companion registering recesses of said casing, the panel being thereby captured between said casing and bracket, said trim plate having an opening for exposing said handle at the front of the panel.

4. A switching device and mounting bracket therefor for mounting the switching device to a panel having an opening at a switching device mounting region, said switching device comprising a casing with a generally planar front wall having an operating handle accessible thereat, said casing having recesses defined therein at the opposite sides thereof, and said bracket being of one-piece sheet metal construction comprising a front peripherally extending trim plate having vertically spaced and aligned fingers at opposite sides thereof defining an opening therebetween, said fingers being provided with inwardly extending resilient detents, the fingers at one side of said plate being horizontally staggered with respect to the fingers at the opposite side thereof, said front trim plate being adapted for overlying engagement with the panel with said fingers extending through the panel opening and along the opposite sides of said casing in the mounted position thereof in which said front wall engages the rear face of the panel, said casing being retained in mounted position with said trim plate engaging the front face of the panel at the opening thereof by the interengagement of said detents in companion registering recesses of said casing, the panel being thereby captured between said casing and bracket, said trim plate having an opening for exposing said handle at the front of the panel, said recesses having mutually inclined walls in the direction of engagement between said bracket and casing, said detents being in surface-to-surface engagement with one inclined wall of said recesses on interengagement therewith with the other inclined wall of said recesses defining shoulders for said detents for resisting separating stresses applied between said bracket and casing.

5. In combination,
   a switching device,
   a panel having an opening therethrough defining a switching device mounting region at the back of the panel,
   a decorative frame plate at the front of said panel having an opening exposing said portion of said switching device, the periphery of said frame-plate opening being substantially aligned with the surface of said exposed portion of said device and the outer periphery of said frame plate being substantially aligned with the front surface of said panel,
   means for securing said switching device and said decorative frame plate to opposite sides of said panel,
   said switching device having an operating handle at said frame-plate opening and having a casing extending laterally outside said panel opening and abutting the back of said panel,
   said securing means comprising laterally spaced parts extending perpendicularly from said frame plate at one said periphery and through said panel opening, against and across opposite edges of said panel opening and thence along opposite sides of said casing, and said parts having projecting detent formations in retentive engagement with companion formations of said casing for securing said decorative frame plate and casing to each other with said panel confined therebetween.

6. In combination,
   a switching device,
   a panel having an opening therethrough defining a switching device mounting region at the back of the panel and the opening having parallel opposite edges,
   a decorative frame plate at the front of said panel having an opening whose periphery defines the exposed portion of said switching device and the outer periphery of said frame plate being substantially aligned with the front surface of said panel, and
   means for securing said switching device and said decorative frame plate to opposite sides of said panel,
   said switching device having an operating handle exposed at said opening in said frame plate and having a casing extending laterally outside said panel opening and abutting the back of said panel,
   said securing means comprising laterally spaced parts extending perpendicularly from said frame plate at one said periphery and through said panel opening, against and across said parallel opposite edges of said panel opening and thence along opposite sides of said casing, said parts being longitudinally coextensive with said parallel opposite edges to provide restraint against longitudinal shifting of the frame plate relative to said panel, and said parts having projecting detent portions in complemental engagement with companion recesses in said casing for securing said decorative frame plate and casing to each other with said panel confined therebetween and to provide restraint against movement of said switching device across the back surface of said panel.

7. In combination, a switching device, a panel having an opening therethrough defining a switching device mounting region at the back of the panel, a decorative frame plate at the front of the panel having an opening exposing a portion of said switching device at said panel opening and the periphery of the frame plate being substantially in alignment with the front surface of the panel, and means for securing said switching device and said decorative frame plate to opposite sides of said panel, said switching device having an operating handle at said frame-plate opening and having a casing portion extending laterally outside said panel opening and abutting the back of said panel, said securing means comprising laterally spaced parts extending perpendicular from said frame plate and through said panel opening against and across opposite edges of said panel opening and thence along opposite sides of said casing, said parts having detent portions in retentive engagement with companion formations of said casing for securing said decorative frame plate and casing to each other with said panel confined therebetween, said detent portions including resilient tongues that extend forward and converge toward said panel, said companion formations on opposite sides of said casing including shoulders which are inclined so as to converge away from the front of said casing, said tongues abutting said shoulders.

8. In combination, a switching device, a panel having an opening therethrough defining a switching device mounting region at the back of the panel, a decorative frame plate at the front of the panel having an opening exposing a portion of said switching device at said panel opening and the periphery of the frame plate being substantially in alignment with the front surface of the panel, said opening in said frame plate having parallel opposite margins, and means for securing said switching device and said decorative frame plate to opposite sides of said panel, said switching device having an operating handle at said frame-plate opening and having a casing portion extending laterally outside said panel opening and abutting the back of said panel, said securing means comprising laterally spaced parts extending perpendicular from the parallel opposite margins of the opening in said frame plate and through said panel opening against and across opposite edges of said panel opening and thence along opposite sides of said casing, said frame plate extending laterally outward of said laterally spaced parts and said parts having detent portions in retentive engagement with companion formations of said casing for securing said decorative frame plate and casing to each other with said panel confined therebetween.

9. In combination, a switching device, a panel having an opening therethrough defining a switching device mounting region at the back of the panel, a decorative frame plate at the front of the panel having an opening exposing a portion of said switching device at said panel opening and the periphery of the frame plate being substantially in alignment with the front surface of the panel, said frame plate having parallel opposite margins, and means for securing said switching device and said decorative frame plate to opposite sides of said panel, said switching device having an operating handle at said frame-plate opening and having a casing portion extending laterally outside said panel opening and abutting the back of said panel, said securing means comprising laterally spaced parts extending perpendicular from said parallel opposite margins of said frame plate and through said panel opening against and across opposite edges of said panel opening and thence along opposite sides of said casing, said frame plate and said laterally spaced parts forming a unitary channel of U-shaped cross-section and said parts having detent portions in retentive engagement with companion formations of said casing for securing said decorative frame plate and casing to each other with said panel confined therebetween.

10. In combination, a switching device, a panel having an opening therethrough defining a switching device mounting region at the back of the panel, a decorative frame plate at the front of the panel having an opening exposing a portion of said switching device at said panel opening and the periphery of the frame plate being substantially in alignment with the front surface of the panel, and means for securing said switching device and said decorative frame plate to opposite sides of said panel, said switching device having an operating handle at said frameplate opening and having a casing portion extending laterally outside said panel opening and abutting the back of said panel, said securing means comprising laterally spaced parts extending perpendicular from said frame plate and through said panel opening against and across opposite edges of said panel opening and thence along opposite sides of said casing, said parts having detent portions in retentive engagement with companion formations of said casing for securing said decorative frame plate and casing to each other with said panel confined therebetween, said exposed portion of said switching device including an elongated area that is raised in relation to said laterally extending panel-abutting casing portion, said panel opening corresponding closely to the outline of said raised area and being thus elongated, the ends of said elongated raised area abutting the end edges of the panel opening and the sides of the elongated raised area being embraced by said laterally spaced parts of said securing means.

References Cited in the file of this patent

UNITED STATES PATENTS

| | | |
|---|---|---|
| 2,113,535 | Cuno et al. | Apr. 5, 1938 |
| 2,211,728 | MacFadden | Aug. 13, 1940 |
| 2,225,592 | MacFadden | Dec. 17, 1940 |
| 2,446,141 | Parsons | July 27, 1948 |
| 2,626,335 | Landin | Jan. 20, 1953 |
| 2,627,359 | Woodward | Feb. 3, 1953 |
| 2,656,577 | Carbary | Oct. 27, 1953 |
| 2,733,321 | Dorfman et al. | Jan. 31, 1956 |
| 2,745,275 | Jacobi | May 15, 1956 |
| 2,831,948 | Fraser | Apr. 22, 1958 |
| 2,907,852 | Long et al. | Oct. 6, 1959 |

FOREIGN PATENTS

| | | |
|---|---|---|
| 755,496 | Great Britain | Aug. 22, 1956 |